(12) United States Patent
Pompei

(10) Patent No.: US 6,641,301 B2
(45) Date of Patent: Nov. 4, 2003

(54) RADIATION DETECTOR WITH PASSIVE AIR PURGE AND REDUCED NOISE

(75) Inventor: Francesco Pompei, Boston, MA (US)

(73) Assignee: Exergen Corporation, Watertown, MA (US)

( * ) Notice: Subject to any disclaimer, the term of this patent is extended or adjusted under 35 U.S.C. 154(b) by 38 days.

(21) Appl. No.: 09/828,744

(22) Filed: Apr. 9, 2001

(65) Prior Publication Data
US 2002/0146055 A1 Oct. 10, 2002

(51) Int. Cl.[7] .............................. G01J 5/04; G01J 5/12; G02B 7/00
(52) U.S. Cl. ...................... 374/125; 374/135; 374/138; 374/208; 356/43; 359/507; 359/509; 250/221; 136/213; 136/224; 136/230; 15/301; 15/409; 134/37
(58) Field of Search .................. 359/507, 509, 359/512; 356/43; 374/208, 125, 126, 135, 138, 179; 136/213, 224, 230; 250/221, 214.1; 15/300.1, 301, 409, 339; 134/34, 37, 42

(56) References Cited

U.S. PATENT DOCUMENTS

| | | | | |
|---|---|---|---|---|
| 3,404,284 A | * | 10/1968 | Doolittle ..................... | 359/509 |
| 3,744,873 A | * | 7/1973 | Jamison ...................... | 359/509 |
| 3,969,943 A | * | 7/1976 | Ohno et al. .................. | 374/126 |
| 4,204,120 A | * | 5/1980 | Riboulet et al. ............ | 250/338.1 |
| 4,306,835 A | * | 12/1981 | Hurley ........................ | 359/509 |
| 4,456,390 A | * | 6/1984 | Junkert et al. ............... | 374/128 |
| 4,636,091 A | | 1/1987 | Pompei et al. ............... | 374/124 |
| 4,738,528 A | * | 4/1988 | Craft ........................... | 374/125 |
| 4,854,730 A | | 8/1989 | Fraden ......................... | 374/164 |
| 4,867,574 A | * | 9/1989 | Jenkofsky .................... | 374/125 |
| 5,012,813 A | | 5/1991 | Pompei et al. ............... | 600/474 |
| 5,199,436 A | | 4/1993 | Pompei et al. ............... | 600/474 |
| 5,229,612 A | | 7/1993 | Pompei et al. ............... | 250/349 |
| 5,245,601 A | * | 9/1993 | Hake ........................... | 359/509 |
| 5,333,784 A | | 8/1994 | Pompei ....................... | 236/91 C |
| 5,528,041 A | | 6/1996 | Pompei ....................... | 250/349 |
| 5,560,711 A | * | 10/1996 | Bu .............................. | 374/179 |
| 5,599,105 A | * | 2/1997 | Ridley et al. ................ | 374/125 |
| 5,690,430 A | * | 11/1997 | Rudolph ..................... | 374/126 |
| 5,764,684 A | | 6/1998 | Pompei ....................... | 374/126 |
| 5,874,736 A | | 2/1999 | Pompei ....................... | 250/338.1 |
| 5,884,235 A | * | 3/1999 | Ebert .......................... | 374/179 |
| 5,957,582 A | * | 9/1999 | Gillen et al. ................. | 374/125 |
| 6,027,244 A | * | 2/2000 | Champetier et al. ......... | 374/126 |
| 6,045,257 A | | 4/2000 | Pompei et al. ............... | 374/132 |
| 6,091,501 A | * | 7/2000 | Saikanmaki et al. ......... | 359/509 |

FOREIGN PATENT DOCUMENTS

DE  3312031 A1 * 10/1983  ................ 374/125

OTHER PUBLICATIONS

"Barnes Engineering Company Model IT-3 Infrared Thermometer," (2 pages), Mar. 1964.*

* cited by examiner

Primary Examiner—Diego Gutierrez
Assistant Examiner—Stanley J. Pruchnic, Jr.
(74) Attorney, Agent, or Firm—Hamilton, Brook, Smith & Reynolds, P.C.

(57) ABSTRACT

A method and apparatus for maintaining a viewing window of a detector substantially clean includes enclosing the detector within a housing, and moving a target surface relative to the viewing window to create an airflow adjacent the viewing window. The housing can include an aperture through which the viewing window of the sensor views the target surface. Motion of the target surface creates an airflow velocity adjacent the viewing window for maintaining the viewing window substantially clean. To increase the accuracy of the detector, a high emissivity area is provided on an outside surface of the housing which faces the target surface.

23 Claims, 2 Drawing Sheets

RADIATION DETECTOR WITH PASSIVE AIR PURGE AND REDUCED NOISE

BACKGROUND OF THE INVENTION

Many devices are available for providing indications of temperature of surfaces. Contact devices such as thermistors or thermocouples must be placed in physical contact with the surface, a disadvantage in some applications. A further disadvantage of such temperature sensors is that they generally require an amount of time in the order of seconds to stabilize to the temperature of the surface.

Radiation detectors have been used as a noncontact alternative to such temperature sensors. Such detectors are based on the principle that the thermal radiation emitted from a surface is proportional to the temperature of the surface raised to the fourth power. Typically radiation sensors much as thermopiles respond to changes in radiation in the order of one tenth second. Unfortunately, these detectors require a clean viewing window and field of view such that the detector can see the target surface without substantial obstructions in the viewing path which can impede the accuracy of the measurement. Air purges have employed sources of compressed air and the like to drive air past the viewing window for maintaining the field of view clear of debris.

SUMMARY OF THE INVENTION

These air purges expend energy, thereby reducing the efficiency of the overall temperature detecting system. These air purges inherently require additional space and hardware, incurring further expense. Further, these purges must be periodically monitored to ensure that they are functioning properly.

It is preferable to provide a passive cleaning system that uses energy from the system, for example, from a moving target surface, to maintain the field of view of the detector substantially clean.

A method for maintaining a viewing window of a sensor substantially clean is provided which includes enclosing the sensor within a housing, and moving a target surface relative to the viewing window to create an airflow and thus a pressure drop adjacent the viewing window. That pressure drop causes air to be drawn past the viewing window of the detector. The housing can include an aperture through which the viewing window of the sensor views the target surface. Motion of the target surface creates an airflow velocity adjacent the viewing window for maintaining the viewing window substantially clean.

In one embodiment, to increase the accuracy of the detector, a high emissivity area is provided on an outside surface of the housing which faces the target surface. The high emissivity area, in one embodiment, is circular in shape and has an emissivity of greater than about 0.8. In one embodiment, the space between the target surface and the housing is limited to less than twice the diameter of high emissivity area, and preferably the space is limited to less than the diameter of the high emissivity area. As a result, radiation from the ambient area, which is not known, is substantially blocked out by the detector to increase the accuracy of the resulting temperature measurement.

In alternative embodiments, the high emissivity area can be any geometric shape. Preferably, the maximum distance between the outside surface and the target surface is less than four times, and more preferably less than two times, the distance from an optic axis of the sensor to an edge of the high emissivity area.

The sensor can include a thermopile, the cold junction of which is thermally connected to the housing.

An umbrella can be attached to an outside surface of the housing which faces the target surface for further blocking out ambient radiation. In one embodiment, the umbrella has a high emissivity area which faces the target surface. Preferably, the umbrella is thermally connected to the housing.

In one embodiment, a washer is disposed adjacent to the housing aperture, the washer having an aperture that is smaller than the housing aperture to be the limiting area in the airflow path through the housing to create a maximum airflow velocity adjacent the viewing window for maintaining the viewing window substantially clean. In alternative embodiments, the housing aperture is the limiting area in an airflow path through the housing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
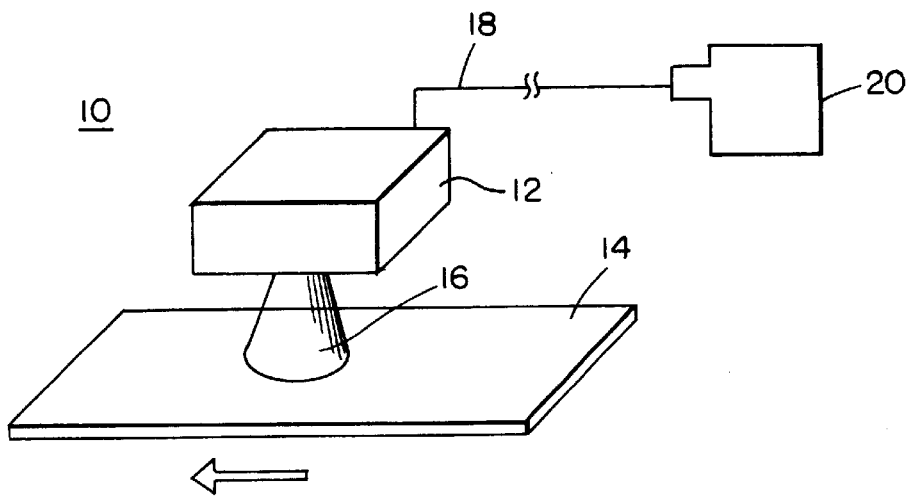
FIG. 1 is a perspective view of a temperature detecting system in accordance with the present invention.

A description of preferred embodiments of the invention follows. FIG. 1 is a perspective view of a temperature detecting system, generally designated by reference numeral 10. A stationary radiation detector 12, which can include a thermopile such as in an infrared thermocouple described in U.S. Pat. No. 5,229,612, is positioned to view a target surface 14 through a field of view 16. In one embodiment, the target surface 14 is movable with respect to the detector 12. In the case of an infrared thermocouple, wires extend through a lead 18 to a remote readout device 20. The readout device 20 can be any conventional device adapted to receive thermocouple leads and provide a display or transmit an output such as thermocouple controllers, PLCs, meters, and transmitters. Alternatively, the lead 18 and readout device 20 may carry and respond to thermopile signals without thermopile compensation.

Figure 2:
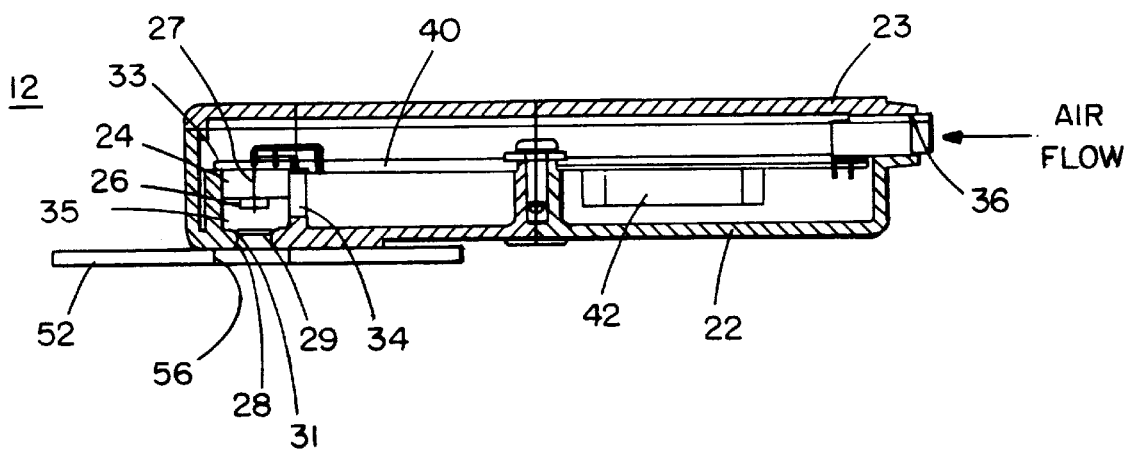
FIG. 2 is a cross-sectional view of the detector shown in FIG. 1.

A cross-sectional view of the detector 12 is shown in FIG. 2. A housing 22 and cover 23 enclose a sensor 24, which can include a thermopile, within a can 25, which includes a flange 33. An aperture 28 in the housing 22 allows the viewing window 26 of the thermopile can 25 to see the target surface 14. In one embodiment, a washer 29 having an aperture 31 is positioned in the housing aperture 28 to provide a tight tolerance of the aperture. In this embodiment, aperture 31 is smaller than aperture 28. Apertures 28, 31 can have any geometric shape, such as circular, square, triangular, etc. Preferably, the viewing window 26 is maintained substantially clean.

Figure 3:
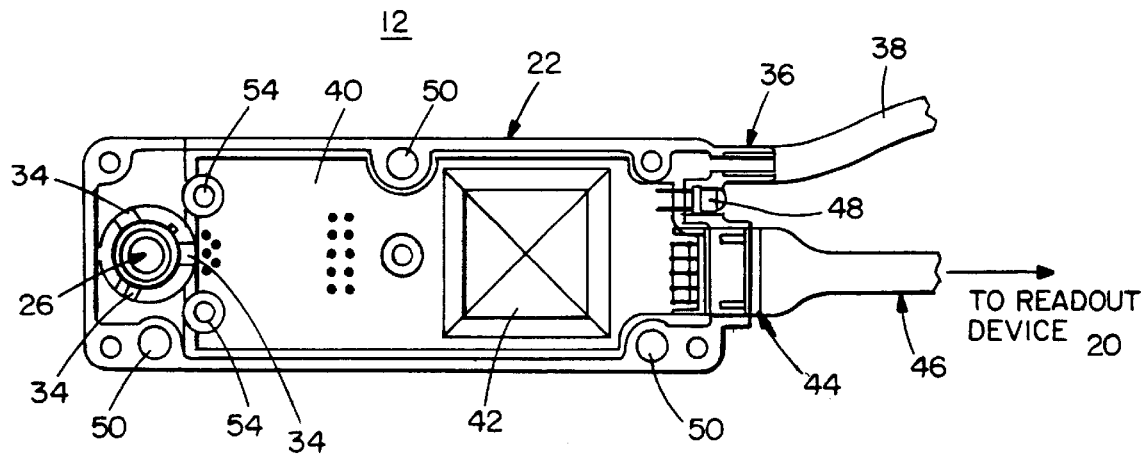
FIG. 3 is a top view of the detector shown in FIG. 1 with a top cover removed.

The housing 22 further supports a printed circuit board (PCB) 40 on which a processor 42, such as a microprocessor, is mounted. A connector 44, as shown in FIG. 3, removably secures a cable 46 which can connect to the readout device 20. A light emitting diode (LED) 48, connected to the PCB 40, can show whether the detector 12 is on or off and can also flash codes for purposes such as diagnostics. Mounting holes 50 are provided in the housing 22 for mounting the detector 12 above the target surface 14.

A plenum is provided in which air is provided to the housing 22 through an air purge fitting 36. An air tube 38 can be connected to the fitting 36 to ensure only clean air is supplied to the housing 22. Air passageways 34 allow air around the sensor 24 to a space 35 between the viewing window 26 and the apertures 28, 31. It is known from Bernoulli's equations that the moving target surface 14 generates an asymptotic velocity profile which creates a low pressure adjacent the viewing window 26. The low pressure thus creates an airflow through the housing 22 from the air tube 36 through passageways 34 and space 35 through apertures 28 and 31. In one embodiment, by limiting the aperture 31 to have a minimum area (width) in the path from the air tube 38 to the aperture 31, the maximum velocity of air is provided adjacent the viewing window 26 to keep it substantially clean. Thus, a passive cleaning system is provided from the moving target surface 14 by limiting the diameter of aperture 31 such that the velocity of air is maximized adjacent the viewing window 26 to keep the viewing window substantially clean.

From prior art systems, for example, U.S. Pat. No. 4,636,091, issued to Pompei et al. on Jan. 13, 1987, it is known that radiation emitted from a target surface includes emitted radiation, which is a function of the emissivity and temperature of the surface, and reflected background radiation. Because the emissivity of the surface is generally not accurately known, assumptions are made, and those assumptions lead to inaccuracies in the temperature reading. Prior art systems include means for eliminating the effects of emissivity on the output. This has been accomplished by means of a high reflectivity hemispherical or conical cup which is placed against the target surface. Radiation from the surface is detected through an aperture in the cup. By reflecting emissions from the target surface back onto that surface, the cup causes the target surface to behave as a black body, the emissivity of which is equal to one, regardless of the actual emissivity of the surface. With the arrangement shown in FIG. 1, it is not feasible to position a high reflectivity cup against the target surface 14 to reduce the background radiation noise.

Figure 4:
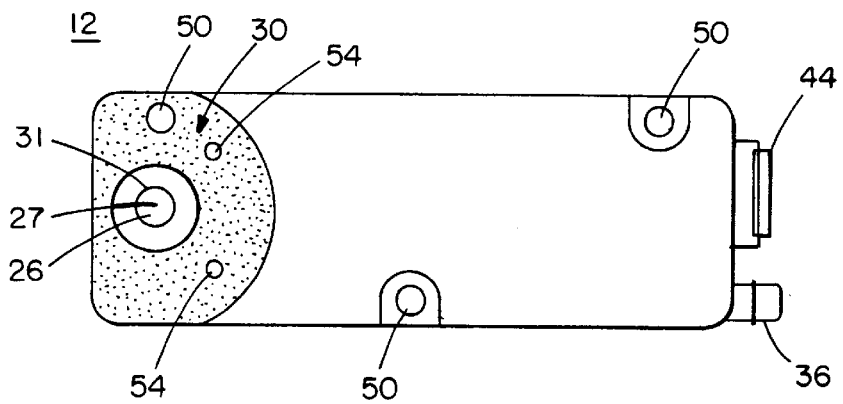
FIG. 4 is a bottom view of the detector shown in FIG. 1.

By making the detector 12 an emitter, that is, by providing a high emissivity surface or area 30 adjacent the viewing window 26 of the sensor 24 as shown in the FIG. 4, the accuracy of the detector 12 is greatly improved. That is, the emissions of the background noise are replaced with the emissions from the detector 12. The flux or radiation from the detector 12 reflected by the target surface 14 is not seen by the sensor 24 because the reflected radiation is from the same temperature as the emitted radiation thereby canceling one another out. One method of providing the high emissivity area 30 is by painting the outside surface on the bottom of the detector 12 substantially black. The high emissivity area 30 can have any geometric shape, such as circular, square, triangular, etc. In one embodiment, the high emissivity area is circular and has an emissivity of great than about 0.8.

For good results, the maximum distance from the bottom of the detector 12 to the target surface 14 is less than about four times the distance from an optic axis 27 of the sensor 24 to an edge of the high emissivity area 30. For even better results, the maximum distance from the bottom of the detector 12 to the target surface 14 is less than about two times the distance from the optic axis 27 of the sensor 24 to an edge of the high emissivity area 30. By maintaining such a close distance, radiation from the ambient area, which is not known, is substantially blocked out by the detector 12 to increase the accuracy of the resulting temperature measurement.

In one embodiment, the sensor can 25, to which the cold junction of the thermopile 24 within the can is connected, is thermally connected to the housing 22 adjacent the target surface 14. As a result, the thermistor or thermopile which typically senses the thermopile cold junction temperature, also detects the housing 22 temperature. Alternatively, a separate thermistor can be provided on the housing 22 of the detector 12. Thermally connecting the detector to the housing provides overall thermal stability for the temperature detecting system 10.

In alternative embodiments, as shown in FIG. 2, an umbrella or shield 52 can be mounted to the bottom of the housing 22 to further block out ambient radiation. Preferably, the umbrella 52 is thermally conductive and is formed from a metal, such as aluminum. The umbrella 52 can be mounted to the housing 22 by mounting holes 54 (FIG. 4) such that the umbrella is thermally connected to the housing so that it is the same temperature as the housing. In alternative embodiments, the umbrella 52 can be attached to the housing 22 by a thermally conductive adhesive to ensure the umbrella and the housing are at the same temperature. The bottom of the umbrella preferably has a high emissivity area 30 for the reasons explained above. The umbrella 52 can be any shape such as curved for applications where the target surface is curved. The umbrella 52 includes an aperture 56 therein to allow the viewing window 26 to see the target surface 14.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for maintaining a viewing window of a sensor substantially clean, comprising:
    enclosing the sensor within a housing; and
    moving a target surface relative to the viewing window to create an airflow adjacent the viewing window;
    the housing including an aperture through which the viewing window of the sensor views the target surface, motion of the target surface creating an airflow velocity adjacent the viewing window for maintaining the viewing window substantially clean.

2. The method of claim 1, further comprising providing a high emissivity area on an outside surface of the housing which faces the target surface.

3. The method of claim 2, wherein the high emissivity area has an emissivity of greater than about 0.8.

4. The method of claim 2, wherein the high emissivity area is circular in shape, and further comprising limiting the space between the target surface and the housing to less than twice the diameter of high emissivity area.

5. The method of claim 4, further comprising limiting the space between the target surface and the housing to less than the diameter of the high emissivity area.

6. The method of claim 2, further comprising specifying that the maximum distance between the outside surface and the target surface is less than four times the distance from an optic axis of the sensor to an edge of the high emissivity area.

7. The method of claim 6, further comprising specifying that the maximum distance between the outside surface and the target surface is less than two times the distance from the optic axis of the sensor to the edge of the high emissivity area.

8. The method of claim 1, wherein the sensor includes a thermopile, further comprising thermally connecting the thermopile to the housing.

9. The method of claim 1, further comprising attaching an umbrella to an outside surface of the housing which faces the target surface, the umbrella having a high emissivity area which faces the target surface.

10. The method of claim 9, further comprising thermally connecting the umbrella to the housing.

11. The method of claim 1, wherein the aperture is the limiting area in an airflow path through the housing.

12. A passive cleaning system for maintaining a viewing window of a sensor substantially clean, comprising a housing enclosing the sensor, the housing being disposed above a moving target surface which creates an airflow adjacent the viewing window, the housing including an aperture through which the viewing window of the sensor views the target surface, motion of the target surface creating an airflow velocity adjacent the viewing window for maintaining the viewing window substantially clean.

13. The system of claim 12, further comprising providing a high emissivity area on an outside surface of the housing which faces the target surface.

14. The system of claim 13, wherein the high emissivity area has an emissivity of greater than about 0.8.

15. The system of claim 12, wherein the high emissivity area is circular in shape, and further comprising limiting the space between the target surface and the housing of the detector to less than twice the diameter of high emissivity area.

16. The system of claim 15, further comprising limiting the space between the target surface and the housing of the detector to less than the diameter of the high emissivity area.

17. The system of claim 12, wherein the sensor includes a thermopile, further comprising thermally connecting the thermopile to the housing.

18. The system of claim 12, wherein the aperture is the limiting area through the housing.

19. A temperature detecting system comprising a sensor disposed within a housing, the sensor including a viewing window for viewing a target surface which moves relative to the viewing window to create an airflow adjacent the viewing window, the housing including an aperture through which the viewing window views the target surface, motion of the target surface creating an airflow velocity adjacent the viewing window for maintaining the viewing window substantially clean.

20. The system of claim 19, further comprising a high emissivity area on an outside surface of the housing which faces the target surface.

21. The system of claim 19, further comprising an umbrella attached to an outside surface which faces the target surface.

22. The system of claim 19, further comprising a washer disposed adjacent to the housing aperture, the washer having an aperture that is smaller than the housing aperture to be the limiting area in the airflow path through the housing to create a maximum airflow velocity adjacent the viewing window for maintaining the viewing window substantially clean.

23. The system of claim 19, wherein the housing aperture is the limiting area in an airflow path through the housing to create a maximum airflow velocity adjacent the viewing window for maintaining the viewing window substantially clean.

* * * * *